United States Patent [19]

Obermeier

[11] Patent Number: 4,704,850
[45] Date of Patent: Nov. 10, 1987

[54] CROP LIFTING ATTACHMENT FOR COMBINE SNOUT

[76] Inventor: Dale T. Obermeier, 1950 First St., Aurora, Nebr. 68818

[21] Appl. No.: 829,212

[22] Filed: Feb. 14, 1986

[51] Int. Cl.$^4$ .............................................. A01D 63/00
[52] U.S. Cl. ........................................ 56/119; 56/112
[58] Field of Search ................. 56/119, 312, 313, 314, 56/318, 319, 320

[56] References Cited

U.S. PATENT DOCUMENTS

| | | | |
|---|---|---|---|
| 2,166,723 | 7/1939 | Knight . | |
| 2,214,965 | 9/1940 | Love | 56/119 |
| 2,862,345 | 12/1958 | Wigham | 56/119 |
| 2,960,814 | 11/1960 | Babcock | 56/312 |
| 2,970,420 | 2/1961 | Schmidt | 56/119 |
| 4,022,000 | 5/1977 | Coxbill | 56/312 |
| 4,214,422 | 7/1980 | McMillan | 56/119 |
| 4,493,181 | 1/1985 | Glendenning et al. | 56/314 |

FOREIGN PATENT DOCUMENTS

| | | | |
|---|---|---|---|
| 2915177 | 1/1980 | Fed. Rep. of Germany | 56/119 |
| 208474 | 2/1940 | Switzerland | 56/312 |

Primary Examiner—Stephen J. Novosad
Assistant Examiner—Bruce M. Kisliuk
Attorney, Agent, or Firm—Zarley, McKee, Thomte, Voorhees & Sease

[57] ABSTRACT

A crop lifting attachment for a combine head having a plurality of forwardly extended snouts includes an elongated lift bar having a foot device on the forward end for sliding movement on the ground and a rearward end adapted for connection to the snout for pivotal movement about the pivot axis of the snout. The lift bar is also connected to the front of the snout with freedom of transverse adjustment. Finally, an auxiliary lift bar is inclined upwardly and transversely from the lift bar toward the snout. Pairs of crop lifting attachments are secured to adjacent sides of adjacent snouts for defining a narrow crop receiving and lifting guide way.

11 Claims, 6 Drawing Figures

CROP LIFTING ATTACHMENT FOR COMBINE SNOUT

BACKGROUND OF THE INVENTION

The present invention is directed generally to a crop lifting attachment for the pivotally supported snout on a combine head and more particularly to a crop lifting attachment adapted to lift downed crops for more efficient gathering by an all-crop head of a combine.

When crops such as sunflower, milo and soybeans are laid over on their sides due to wind, root rot or the like, problems are encountered in harvesting them. For example, if milo is leaning toward the combine, the heads may be cut off and fall to the ground before they can be collected. This problem has previously been dealt with by running the combine in a single direction across the field and returning in a non-operating condition for the next pass in the same direction.

Another problem with laid over crops is that the combine head has to be lowered to the extent that the crop is cut low and much more stubble is run through the combine and discharged as trash from the rear end of the combine. This slows down the harvesting speed and makes the machine more susceptible to picking up dirt and objects lying in the field which can damage the combine.

Crop lifting bars generally are known and disclosed in Knight U.S. Pat. No. 2,166,723; Love U.S. Pat. No. 2,214,965 and Coxbill U.S. Pat. No. 4,022,000. Furthermore, a previous attempt has been made to add a crop lifting bar to the pivotal snout of a combine, as in Glendenning U.S. Pat. No. 4,493,181. The effectiveness of the known lifting bars has been limited, however, in the context of lifting bars associated with the pivotal snouts of a combine head. For example, the positioning of the forward ends of the crop lifting bars in Glendenning at or rearwardly of the point of the snout severely limits the lifting capability of the bars. Furthermore, the slidable rear mount for the crop lifting bars of Glendenning accommodates pivotal movement of the snout but increases the manufacturing expense, installation time and trouble and maintenance of the unit.

Accordingly, a primary object of the invention is to provide an improved crop lifting attachment for a combine snout.

Another object is to provide a crop lifting attachment for a combine snout which lifts downed crops for efficient harvesting.

Another object is to provide a crop lifting attachment for a combine snout which enables even downed crops to be harvested with the head at an elevated position at which only a minimal amount of stubble is cut and processed.

A further object of the invention is to provide a crop lifting attachment for a combine snout which enables an increase in harvesting speed and a descrease in maintenance necessitated by foreign matter gathered by the combine head.

Another object is to provide a crop lifting attachment which enables a farmer to successfully harvest substantially all of the crop in a field, whether it be in a downed or standing position.

Finally, an object of the invention is to provide a combine snout crop lifting attachment which is simple and rugged in construction, economical to manufacture and efficient in operation.

SUMMARY OF THE INVENTION

The crop lifting attachment of the present invention is adapted for use with a combine head having a plurality of transversely spaced-apart forwardly extended gathering shields or snouts which are connected to the head for pivotal movement about respective transverse pivot axes. A pair of crop lifting attachments are mounted on opposite sides of each snout except for the end snouts which require a crop lifting attachment only on the interior side.

Each attachment includes an elongated lift bar having a turned up foot on the forward end for sliding movement on the ground and a bracket on the rearward end for attachment of the rearward end of the lift bar to the snout for pivotal movement about the respective transverse pivot axis of the snout. The forward end of the lifting bar is supported on a forward portion of the snout for transverse movement toward and away from the snout. A lock device is provided for securing the lift bar in a selected transverse position relative to the snout. Finally, an auxiliary lift bar is connected to each lift bar adjacent the turned up foot portion and is inclined upwardly and transversely toward the snout.

The position and upward inclination of the lift bars and associated auxiliary lift bars lift the crop material so that it may be engaged by the rubber belts or the like to which the snouts feed the material. As a result, the cutter head can be set much higher, thereby leaving 12 inch to 18 inch stubble, processing much less trash and operating at increased ground speed while harvesting a greater percentage of the crop than was heretofore possible.

DESCRIPTION OF THE PREFERRED EMBODIMENT

Figure 1:
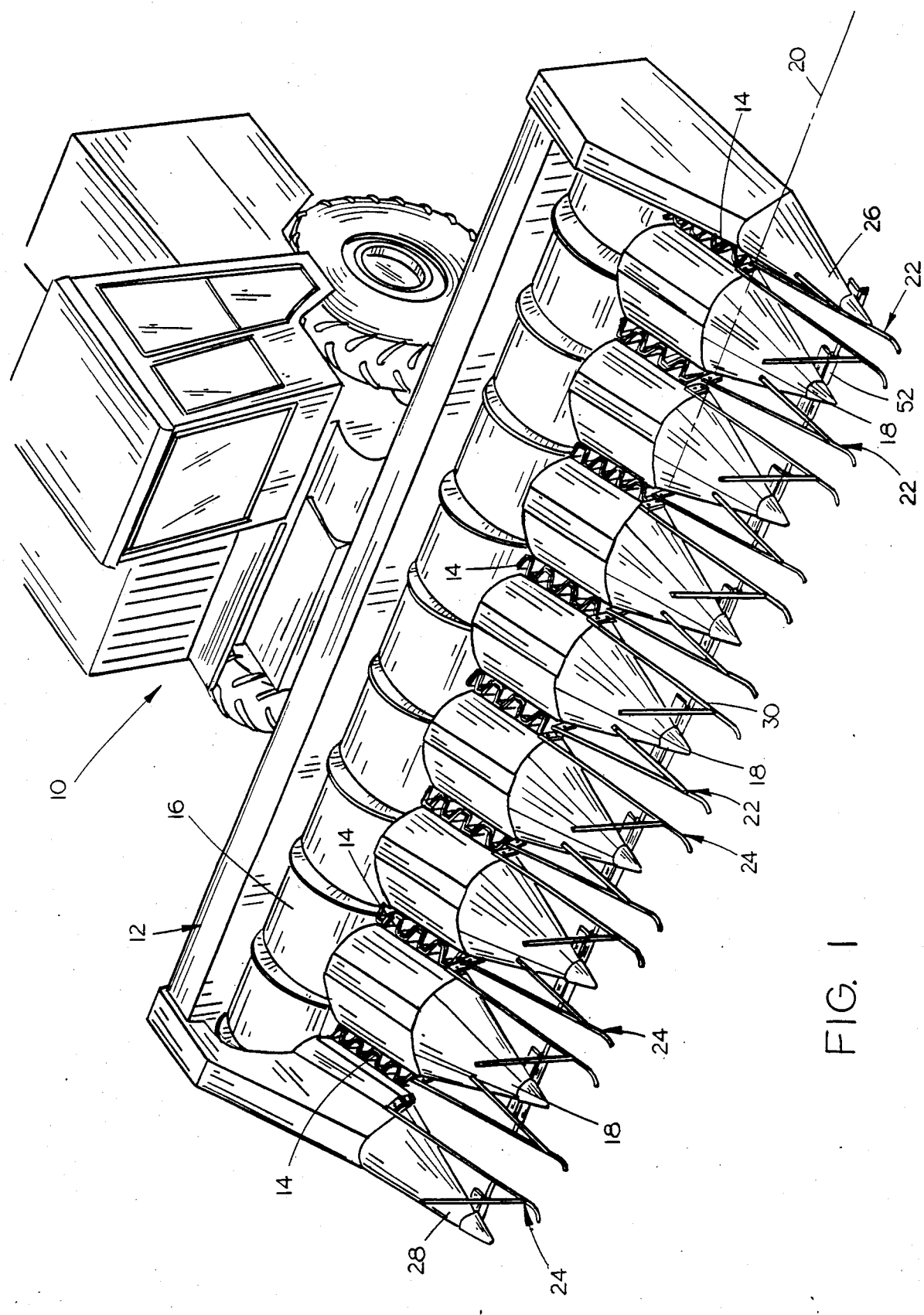
FIG. 1 is a perspective view of a plurality of the crop lifting attachments mounted on the all-crop head of a combine.

FIG. 1 illustrates a crop harvesting combine 10 having an all-crop head 12 mounted thereon. The all-crop head is preferably of the type manufacture by John Deere, which head can be mounted on the combines of most manufacturers with a commercially available head changer. The combine 10 is capable of adjusting the vertical position of the head for harvesting. The head includes a plurality of crop gathering units 14 for supporting the cut crop and conveying it rearwardly to the large auger 16 for delivery to the combine throat. The head 12 further includes a plurality of gathering shields or snouts 18 which are supported for pivotal movement about respective transverse axes, indicated by line 20, and which taper forwardly between the gathering units 14 for directing crop toward the gathering units in response to forward movement of the combine.

Supported on each snout 18 are a pair of right and left crop lifting attachments 22 and 24 of the present invention. A right crop lifting attachment 22 is also secured to the left end snout 26 of the head 12 and a left crop lifting attachment 24 is mounted on the right end snout 28 of head 12.

Figure 2:
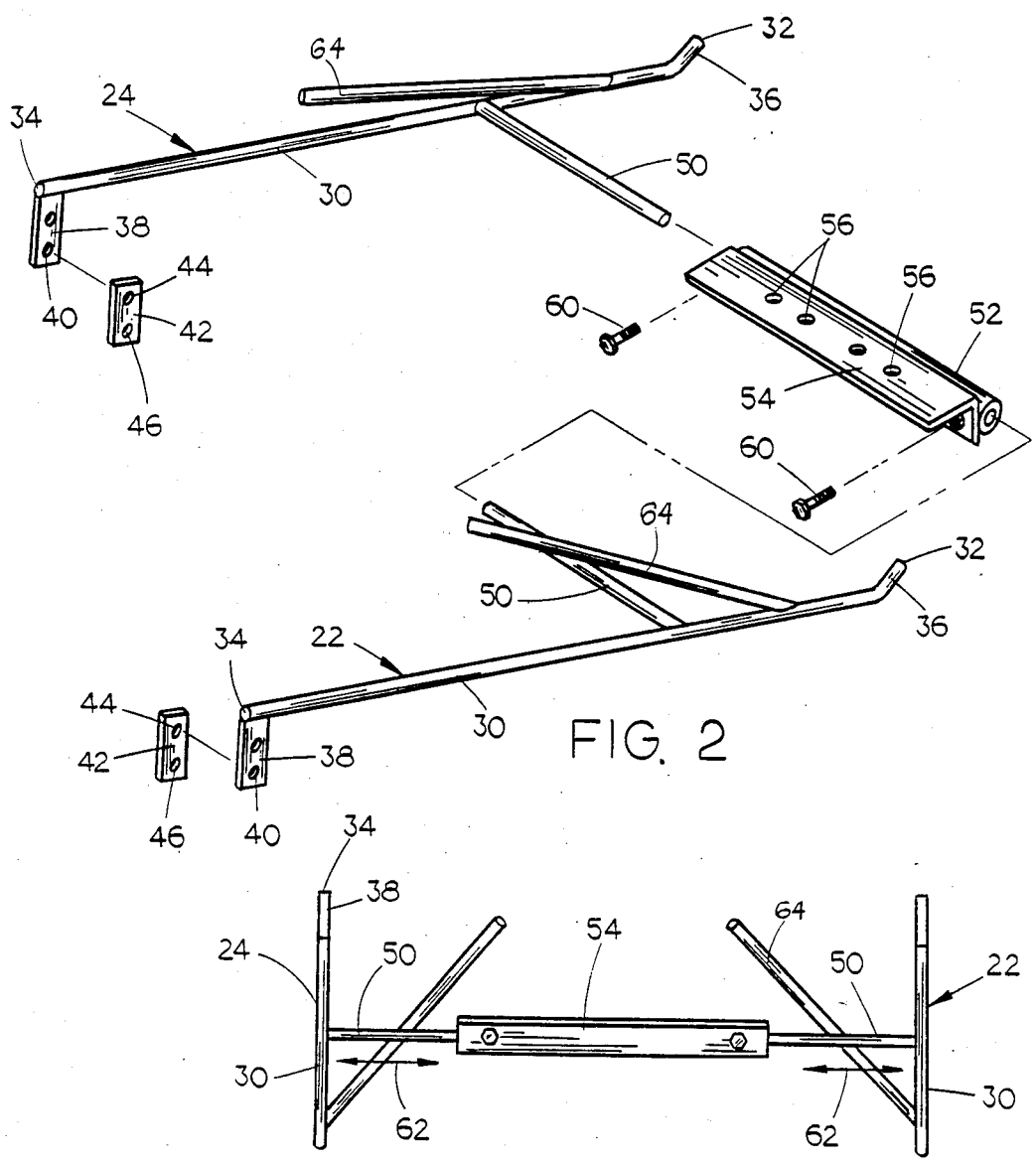
FIG. 2 is an exploded perspective view of the various parts of the attachment.
Figure 3:
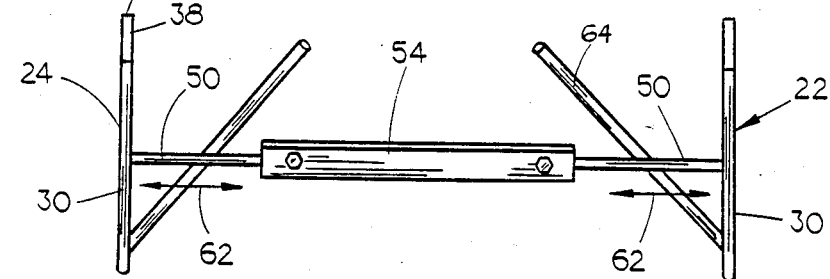
FIG. 3 is a rear elevational view of the attachment.
Figure 4:
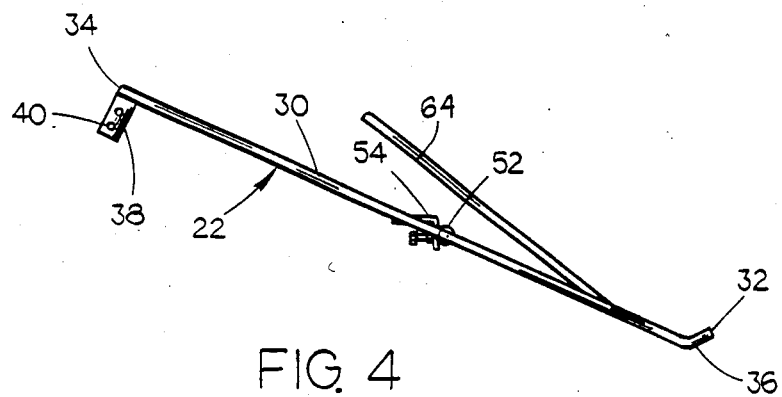
FIG. 4 is a side elevational view of the attachment.
Figure 5:
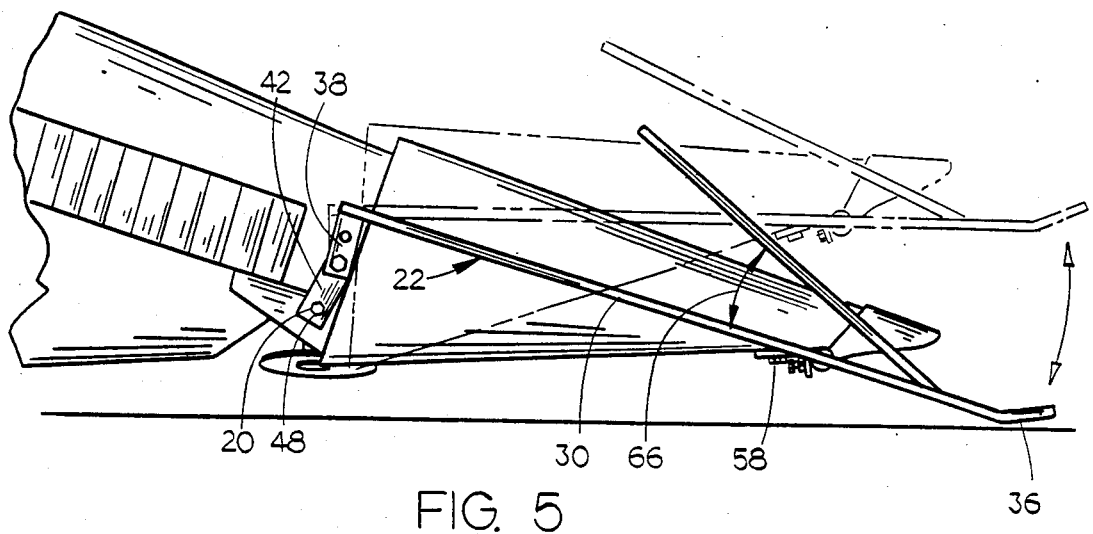
FIG. 5 is a partial side elevational view of the attachment installed on a pivotally movable combine snout.

In FIGS. 2, 3 and 5, it can be seen that the right and left crop lifting attachments 22 and 24 are constructed as the mirror images of one another. Accordingly, the same reference numerals will be used to designate like parts of each.

Referring to FIG. 2, each crop lifting attachment includes an elongated lift bar 30 having forward and rearward ends 32 and 34. The forward end 32 is equipped with a turned up foot 36 for sliding movement on the ground. The foot 36 may simply to a bent end portion of the lift bar 30.

The rearward end of the lift bar 30 has a depending mounting bracket 38 secured to it, which bracket includes a pair of vertically spaced-apart mounting holes 40. Associated with mounting bracket 38 is a pivot link 42 having upper and lower mounting holes 44 and 46. Link 42 is adapted for pivotal connection to bracket 38 by a bolt inserted through lowermost hole 40 and upper hole 44. The lower hole 46 is adapted to receive the same bolt 48 (FIG. 5) which pivotally secures the snout 18 to the head 12.

Each lift bar 30 additionally has a mounting arm 50 extended transversely inwardly therefrom at an intermediate position between the forward and rearward ends 32 and 34 of the bar. The mounting arms 50 of the right and left hand crop lifting attachments 22 and 24 are adapted to be slidably received within opposite ends of an elongated mounting sleeve 52. Sleeve 52 is welded or otherwise fixed to an angle iron bracket 54 having a plurality of mounting holes 56 through the upper flange thereof for securement to the underside of snout 18 by bolts 58 (FIG. 5).

To adjustably fix the position of each mounting arm 50 within the mounting sleeve 52, a pair of set screws 60 are threadably received through openings extended through the angle iron bracket 54 and mounting sleeve 52. Accordingly, one need only loosen the set screw to adjust the transverse position of the associated mounting arm 50, whereupon the set screw can be retightened to lock the mounting arm in the adjusted position. Arrows 62 in FIG. 3 indicate the transverse adjustability of the mounting arm 50 relative to the mounting sleeve 52.

Each lift bar 30 is additionally equipped with an auxiliary lift bar 64 which extends upwardly and transversely from a forward portion of the lift bar. The auxiliary lift bar extends transversely toward the same side of the lift bar as does the mounting arm 50. The precise angle of inclination between the auxiliary lift bar 64 and lift bar 30 is not critical to the present invention. A 30° vertical angle as indicated by arrow 66 in FIG. 5 and a 30° horizontal angle as indicated by arrow 68 in FIG. 6 have proven to be workable.

Figure 6:
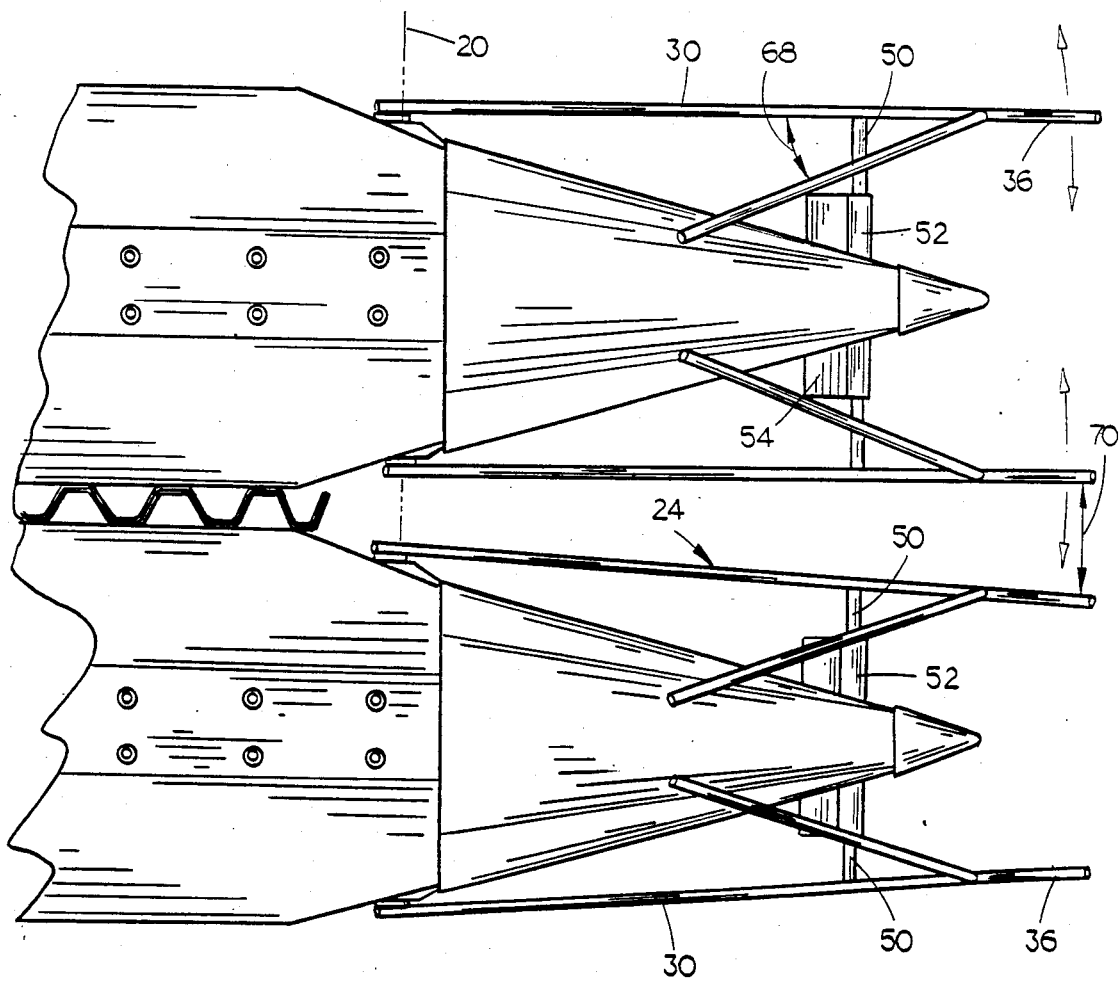
FIG. 6 is a partial top plan view of the attachments installed on adjacent combine snouts.

In operation, the crop lifting attachments are easily installed on the snouts of an all-crop head for a combine. The angle iron bracket 54 for mounting sleeve 52 is first secured to the underside of the snout adjacent the forward end thereof. The fore and aft position of the mounting sleeve 52 should be such that when the mounting arm 50 of a crop lifting attachment is slidably inserted therein, the rear bracket 38 of the lift bar can be positioned closely adjacent the pivot axis 20 for the snout. The pivot links 42 are then mounted on the same bolts 48 that secure the snouts to the head and the upper ends of the links are connected to the rear brackets 38 of each lift bar. The right and left crop lifting attachments 22 and 24 are arranged to that the auxiliary lift bars converge toward one another and toward the snout as shown in FIG. 6. The transverse positions of the lift bars are then adjusted and set using set screws 60. Preferably, the adjacent lift bars 30 on adjacent snouts are spaced so that the forward ends are between 9 and 10 inches apart at the position indicated by arrow 70 in FIG. 6. Accordingly, each lift bar is positioned approximately 4½ inches from the crop row. Any closer tolerances would make steering of the combine difficult and impractical.

Upon forward movement of the combine through a field, the adjusted lift bars extend downwardly and forwardly from the snouts as shown in FIG. 5, thereby enabling the head and snouts to be positioned in clearance relation above the ground where less trash and foreign material will be picked up and processed through the combine. The forward extension of the lift bars 30 beyond the ends of the snouts and at positions closer to the crop rows enables the bars to slide below downed crop and lift it to a standing position for engagement by the feeder units 14 of the all-crop head 12. It has been found that a head 12 equipped with the crop lifting attachments 22 and 24 can leave stubble up to 12 to 18 inches high and still save approximately 95-98% of downed crop.

Whereas the invention has been shown and described in connection with a preferred embodiment, it is understood that many modifications, substitutions and additions may be made which are within the intended broad scope of the appended claims. For example, various support structures are possible to provide for support and transverse adjustment of the forward ends of the lift bars. Whereas the connection of the rearward end of the lift bars to the pivot axis for the snout is important for simplifying the crop lifting attachment, the specific securement structure is not critical.

Thus there has been shown and described a crop lifting attachment for a combine snout, which attachment accomplishes at least all of the stated objects.

I claim:

1. A crop lifting attachment for a combine head, said head including a plurality of transversely spaced-apart forwardly extended gathering shields mounted thereon for pivotal movement about respective transverse pivot axis, said attachment comprising, an elongated lift bar having forward and rearward ends, turned up foot means on the forward end thereof for sliding movement on the ground, means for pivotally supporting the rearward end of the lift bar on a gathering shield for pivotal movement therewith about the respective transverse pivot axis therefor, means for adjustably supporting said lift bar, at an intermediate position between said forward and rearward ends, on a forward portion of said gathering shield for transverse movement toward and away from the forward end of the gathering shield, lock means for securing the lift bar in a selected transverse position relative to the gathering shield, and an auxiliary lift bar connected to said lift bar adjacent said turned up foot means and inclined upwardly and transversely therefrom.

2. The crop lifting attachment of claim 1 wherein said means for adjustably supporting said lift bar comprises a mounting sleeve adapted for securement to the underside of the gathering shield and a mounting arm connected to the lift bar and extended transversely therefrom for sliding movement in said mounting sleeve.

3. The crop lifting attachment of claim 2 wherein said lock means comprises a set screw associated with said mounting sleeve for securing the mounting arm at selected positions therein.

4. The crop lifting attachment of claim 2 wherein said auxiliary lift bar is inclined upwardly and transversely inwardly from the lift bar toward the gathering shield.

5. The crop lifting attachment of claim 1 in combination with a second crop lifting attachment constructed as the mirror image of said crop lifting attachment, said attachments adapted for connection to opposite sides of the same gathering shield.

6. The crop lifting attachment of claim 5 wherein the means for adjustably supporting each lift bar comprises a transversely extended mounting sleeve adapted for securement to the underside of the gathering shield and a pair of mounting arms connected to the lift bars and extended transversely inwardly therefrom toward the gathering shield for sliding movement within said mounting sleeve.

7. The crop lifting attachment of claim 6 wherein said lock means comprises a pair of set screws associated with the mounting sleeve for securing the mounting arms at selected transverse positions therein.

8. The crop lifting attachment of claim 1 wherein said means for pivotally supporting the rearward end of the lift bar comprises a bracket extended downwardly from the rearward end of the lift bar and a pivot link having an upper end adapted for pivotal connection to said bracket and a lower end adapted for connection to the gathering shield for pivotal movement therewith about the respective transverse pivot axis thereof.

9. The crop lifting attachment of claim 5 wherein said lift bars are transversely adjustable in opposite directions from forwardly extended parallel positions of the respective lift bars.

10. Crop lifting attachments for a combine head, said head including a plurality of transversely spaced-apart forwardly extended gathering shields mounted thereon for pivotal movement about respective transverse pivot axes, said attachments comprising, a left hand attachment including an elongated lift bar having forward and rearward ends, turned up foot means on the forward end thereof for sliding movement on the ground, means for pivotally supporting the rearward end of the lift bar on a gathering shield for pivotal movement therewith about the respective transverse pivot axis therefor, a mounting arm connected to the lift bar rearwardly of said foot means and extended transversely to the right therefrom, and an auxiliary lift bar connected to said lift bar adjacent said foot means and inclined upwardly and to the right therefrom, a right hand attachment including an elongated right hand lift bar having forward and rearward ends, turned up foot means on the forward end thereof for sliding movement on the ground.

means for pivotally supporting the rearward end of the right hand lift bar on the right side of a gathering shield for pivotal movement therewith about the respective transverse pivot axis therefor, a right hand mounting arm connected to the right hand lift bar rearwardly of the foot means and extended transversely to the left therefrom, and a right hand auxiliary lift bar connected to said right hand lift bar adjacent said turned up foot means and inclined upwardly and to the left therefrom, a mounting sleeve adapted for securement to the underside of the gathering shield, said mounting arm of said right hand and left hand attachments being transversely slidably received by said mounting sleeve for adjustment of the forward ends of said lift bars transversely relative to the gathering shield, and lock means for securing said right hand and left hand attachments in selected transverse positions relative to the gathering shield.

11. In combination, a combine head having a plurality of transversely spaced-apart forwardly extended gathering shields connected to the head for pivotal movement about respective transverse pivot axes, and a crop lifting attachment comprising, an elongated lift bar having forward and rearward ends, turned up foot means on the forward end thereof for sliding movement on the ground, means for pivotally supporting the rearward end of the lift bar on a gathering shield for pivotal movement therewith about the respective transverse pivot axis therefor, means for adjustably supporting said lift bar, at an intermediate position between said forward and rearward ends, on a forward portion of said gathering shield for transverse movement toward and away from the forward end of the gathering shield, lock means for securing the lift bar in a selected transverse position relative to the gathering shield, and an auxiliary lift bar connected to said lift bar adjacent said turned up foot means and inclined upwardly and transversely therefrom.

* * * * *